(12) United States Patent
Ott

(10) Patent No.: US 6,321,774 B1
(45) Date of Patent: Nov. 27, 2001

(54) CONTROL VALVE FOR CRYOGENIC USE

(75) Inventor: Karl-Heinz Ott, Unterschleissheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/483,609

(22) Filed: Jan. 14, 2000

(30) Foreign Application Priority Data

Jan. 15, 1999 (DE) ................................................ 199 01 257

(51) Int. Cl.<sup>7</sup> ............................... F16K 3/26; F16K 31/04
(52) U.S. Cl. .................. 137/219; 137/625.3; 251/129.11
(58) Field of Search ............................... 137/219, 625.3; 251/129.11

(56) References Cited

U.S. PATENT DOCUMENTS

| 4,294,286 | 10/1981 | Ohumi . |
| 4,611,630 | * 9/1986 | Muchow et al. .................. 137/219 X |

FOREIGN PATENT DOCUMENTS

| 3933169 | 4/1991 | (DE) . |
| 29706688 | 8/1997 | (DE) . |
| 0257906 | 3/1988 | (EP) . |
| 0743476 | 11/1996 | (EP) . |

* cited by examiner

*Primary Examiner*—Gerald A. Michalsky
(74) *Attorney, Agent, or Firm*—W. F. Fasse; W. G. Fasse

(57) ABSTRACT

A motor-driven control valve for cryogenically liquified rocket propellant comprises a valve casing with a co-axial inlet port and outlet port, a slidable regulating sleeve, an electric motor, a gear, a drive chamber within the casing, and a drive transmission in the drive chamber. The regulating sleeve is centrally arranged and slidably mounted and sealed in the valve casing and the drive chamber. Flow slots are circumferentially distributed around the regulating sleeve. The externally mounted motor and gear control the position of the regulating sleeve through the drive transmission. Sliding adjustment of the position of the sleeve regulates the exposed cross-section of the flow slots, thereby also regulating the open and closed switching of the control valve. The regulating sleeve is the only moving part exposed to the flowing liquid, and the liquid pressure and flow forces act only radially on the axially slidable sleeve, so that the hydraulic forces do not influence the driving force required for opening and closing the valve.

24 Claims, 2 Drawing Sheets

CONTROL VALVE FOR CRYOGENIC USE

PRIORITY CLAIM

This application is based on and claims the priority under 35 U.S.C. § 119 of German Patent Application 199 01 257.1, filed on Jan. 15, 1999, the entire disclosure of which is incorporated herein by reference.

FIELD OF THE INVENTION

The invention relates to a control valve for cryogenic use, in particular, a control valve for controlling a flow of cryogenically liquefied rocket fuel.

BACKGROUND INFORMATION

Control valves used for supplying cryogenically liquified fuel to larger rocket engines must operate under extreme operating conditions. For example, they must operate at extremely low temperature and are subject to high mass flow and high pressure. Furthermore, the switching times for opening and closing the valve must be short and the energy requirements low. The effects of such operating conditions must be taken into consideration in the design and construction of such control valves.

Control valves for use with cryogenically liquefied rocket fuel are known in which the switching forces required for opening and closing the valve are essentially determined by flow resistance or interference forces that act on the valve plunger and other movable valve components, especially as the valve plunger is being moved to open or close the valve. With these known types of control valves, the flow forces are not reduced or compensated by the structural design of the valves, and therefore such forces undesirably increase the drive power required for opening or closing the valve, particularly when large nominal dimensions, high nominal pressures, and short switching times are required.

SUMMARY OF THE INVENTION

In view of the above, it is an object of the invention to provide a control valve that is suitable for controlling a liquid flow, and particularly a cryogenic liquid flow, and that achieves short switching times, requires reduced driving forces for opening and closing the valve, and has low drive power requirements. More particularly, it is an object of the invention to provide a valve arrangement in which the hydraulic forces acting on the moving components of the valve can be minimized, compensated or eliminated. The invention further aims to avoid or overcome the disadvantages of the prior art and to achieve additional advantages, as are apparent from the present description.

The above objects have been achieved according to the invention in a control valve especially for use with cryogenically liquified rocket propellant. Through its special structural design, the valve arrangement reduces or provides compensation of the hydraulic forces that act on the valve plunger. This results in a reduction of the switching forces required to open and close the valve and, thus, in a reduction of the required drive power.

The control valve preferably has a coaxial inlet port and outlet port. A regulating or control sleeve with flow slots around its circumference is centrally arranged in the valve housing or casing between the inlet and outlet ports, such that the sleeve is slidably displaceable in an axial direction. The regulating sleeve is connected to a drive linkage that in turn is connected to a drive mechanism, for example, a motor-driven gear with a drive shaft or stroke rod. The motor and gear are preferably mounted outside of the valve casing proper, such that they are not in the path of the flow. The drive shaft or stroke rod is arranged in the valve casing perpendicularly to the axial direction in which the regulating sleeve is slidable, and perpendicularly to the net overall direction of flow from the inlet port to the outlet port. Rocket propellant flows into the control valve at the inlet port and flows along a generally circularshaped flow channel that extends around the drive chamber which houses the drive linkage and then meets radially with the regulating sleeve. The regulating sleeve is slidingly displaced by the drive mechanism and the drive linkage in the axial direction, relative to the position of the drive mechanism, thereby selectively moving the flow slots into a position that will allow flow from the flow channel through a cross-section of the flow slots into the outlet port, or into a position that will block flow.

The embodiments of the invention provide extensive compensation or avoidance of the influence of the hydraulic forces in open as well as in closed valve positions. The drive forces required to switch the valve and, consequently, the power requirements to drive the valve are minimized. This is achieved for both the open and closed valve positions. In the closed valve position, the pressure of the rocket fuel is applied exclusively radially onto the regulating sleeve. Thus, there is no force in a direction opposite the direction of opening displacement of the regulating sleeve, and there is no force against which the regulating sleeve must be actively pushed to maintain the closed position. Since the drive mechanism does not have to overcome the flow force to switch the valve position, the power required to switch the control valve is also not influenced by the flow force. In the open valve position (and in intermediate, partially open positions), the regulating sleeve is not subject to substantial force influence from the flow forces because the flow forces are radially balanced and substantially perpendicular relative to the sliding direction of the regulating sleeve, and because of the desired pressure compensation between the flow channel and the drive chamber.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
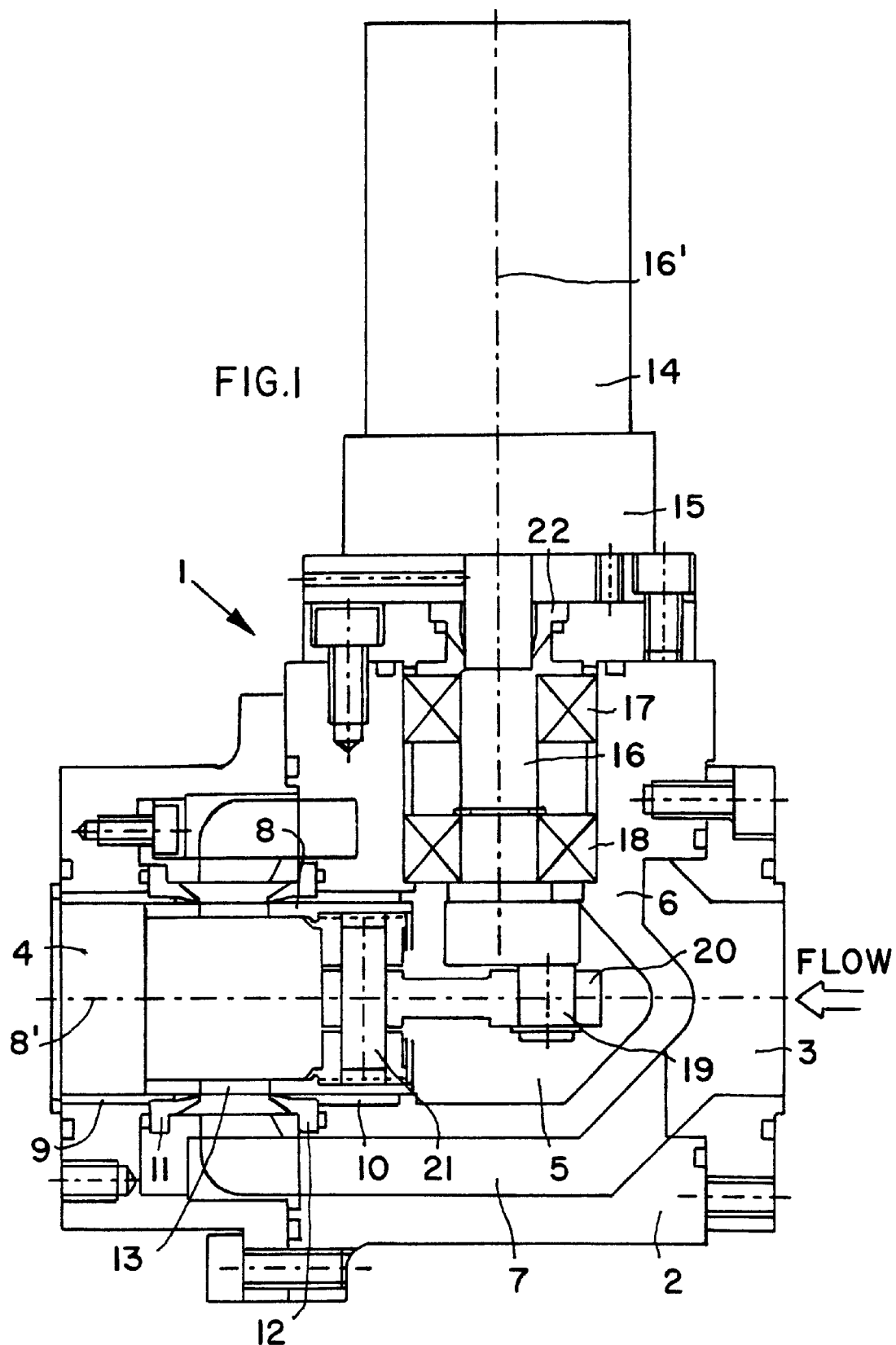
FIG. 1 shows a first example embodiment of a control valve using an eccentric drive mechanism, in an open position.

FIG. 1 shows a first example embodiment of a control valve 1 for cryogenic fluids, in particular for cryogenically liquified rocket propellant. In this example embodiment the control valve 1 is actuated by means of an electric motor 14, a planetary gear 15, and a drive shaft 16, which can be considered to be components of an overall drive motor arrangement.

The control valve 1 comprises a valve casing 2 with a co-axial inlet port 3 and outlet port 4, and an internal drive chamber 5. The drive chamber 5 is rigidly supported in the valve casing 2 by a support structure 6 that has one or more reinforcing ribs spanning or extending across an annular flow channel 7. The flow channel 7 continues past the support structure 6, around the drive chamber 5, and then meets substantially radially with a slidable regulating sleeve 8. Such an arrangement of the flow channel 7 is regarded as being substantially annular and substantially coaxial around the axis of the drive chamber.

Figure 2:
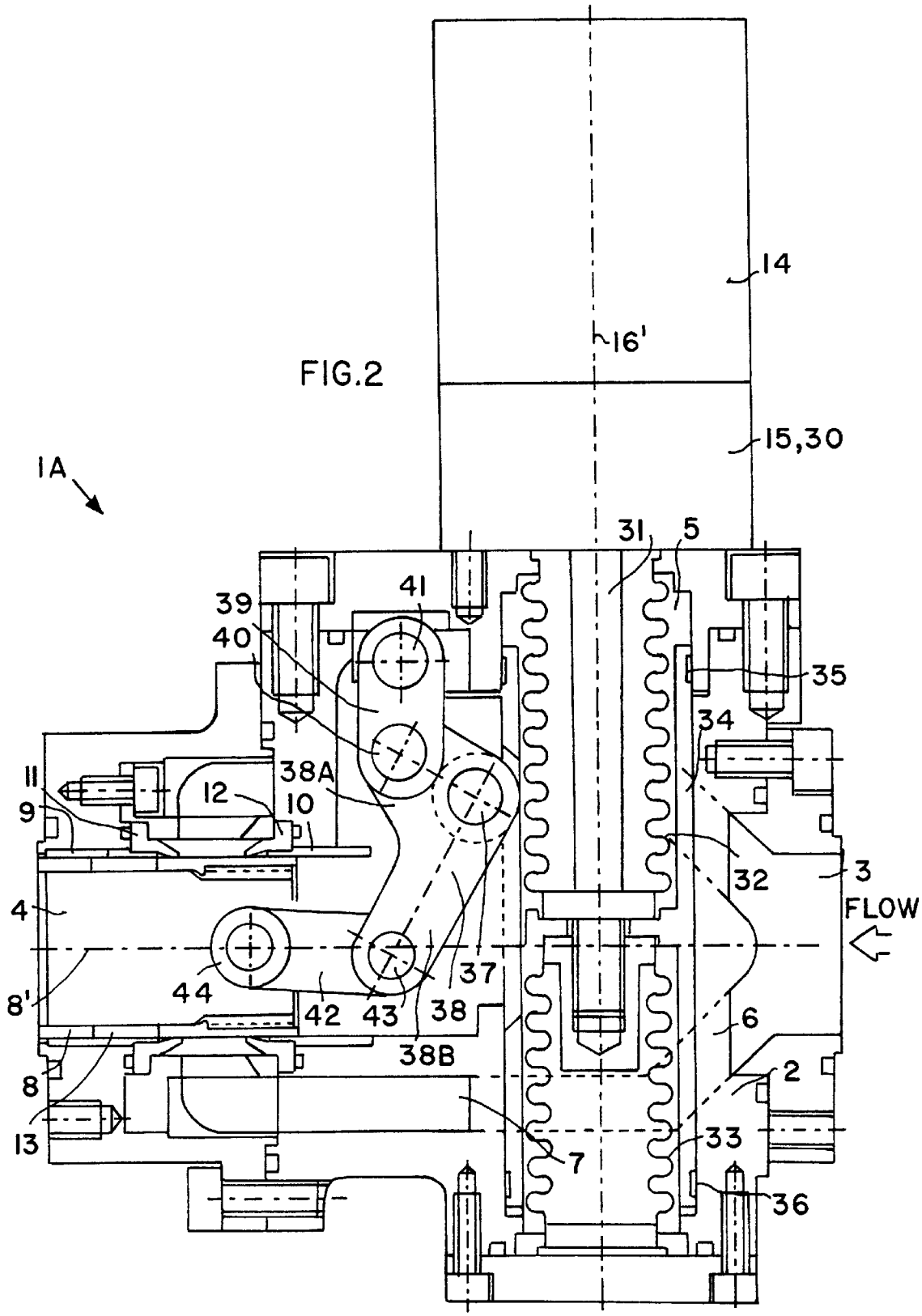
FIG. 2 shows a second example embodiment of a control valve using a spindle and lever drive mechanism, in a closed position.

The regulating sleeve 8 is preferably slidably supported to be slidable along an axial sliding direction 8', and sealed in both the outlet port of the valve casing 2 and the drive chamber 5 by means of respective first and second slide bearing rings 9, 10 and first and second lip seals 11, 12. Several flow slots 13 are spaced around the circumference of the regulating sleeve 8. The outer diameter or surface of the regulating sleeve 8 is preferably relieved slightly in the area around the flow slots 13 in order to ensure free movement of the sleeve 8 without interference from and without causing damage to, the lip seals 11, 12. The sliding displacement of the regulating sleeve 8 in the valve casing 2 selectively positions the flow slots 13 partially or entirely in the flow channel 7 as shown in FIG. 1, or entirely out of the flow channel 7 (whereby the solid portion of the sleeve wall will block flow through the flow channel, As shown in FIG. 2), and thereby regulates the opening and closing of the control valve. The size, shape and position of the flow slots 13 determine the control characteristic of the control valve 1.

The control valve 1 is actuated by the preferably electronically commutated direct-current motor 14 that drives the drive shaft 16, which is particularly a rotatable drive shaft. Alternatively to the d.c. electric motor 14, any other rotational drive motor such as a hydraulic motor could be used, or a linear drive motor could drive a linearly actuated drive shaft or rod. The motor 14 drives a reduction gearing such as the planetary gear 15 that is flange-mounted on the outside of the valve casing 2. The planetary gear 15 in turn drives the drive shaft 16, which passes through a hole in the valve casing 2 into the interior thereof, and particularly into the drive chamber 5. Alternatively, the drive shaft 16 may be directly driven by an appropriate drive motor, i.e. without an intervening planetary gear 15. The drive shaft 16 is preferably rotatably mounted and supported by means of two roller bearings 17 and 18 and preferably sealed on the interior side of the valve casing 2 by means of a lip seal 22.

An eccentric drive pin 19 extends from a lower end of the drive shaft 16 with an eccentric offset relative to the rotation axis 16' of the shaft 16. A connecting rod 20 is rotatably connected to the eccentric drive pin 19, and pivotably connected with the regulating sleeve 8 by means of a pivot bolt 21. When the drive shaft 16 rotates, the eccentric drive pin 19 and the connecting rod 20 cooperate to slidably displace the regulating sleeve 8 in the axial sliding direction 8'. Depending on the position of the regulating sleeve 8, a cross-section of the flow slots 13 is open at the location where the flow channel 7 meets the regulating sleeve 8 and rocket propellant is allowed to flow to the outlet port 4, or the flow slots 13 are situated beyond the area where the flow channel 7 meets with the regulating sleeve 8, thus preventing the rocket propellant from flowing to the outlet port 4. As shown in FIG. 1, the position of the regulating sleeve 8 is fully open, i.e. a full cross-section of the flow slots 13 is open to allow fuel to flow from the flow channel 7 into the outlet port 4.

FIG. 2 shows a second example embodiment of a control valve 1A for cryogenic fluids, particular for cryogenically liquified rocket propellant. In this second example embodiment the control valve 1A is actuated by means of an electric motor 14, a planetary gear 15 with a spindle drive 30 and a two-arm lever 38. In FIG. 2, the same reference numbers have been used to identify the components of this second embodiment that are identical to the components of the first embodiment as discussed above.

Similar to the first embodiment of the control valve 1, the control valve 1A comprises a valve casing 2 with a coaxial inlet port 3 and outlet port 4 and an internal drive chamber 5. The drive chamber 5 is supported in the valve casing 2 by a support structure 6 that includes one or more reinforcing ribs extending through or across the annular flow channel 7. The flow channel 7 is oriented substantially radially at a location behind the support structure 6 and the drive chamber 5, where the flow channel 7 meets a slidable regulating sleeve 8. Several flow slots 13 are spaced around the circumference of the regulating sleeve 8. The regulating sleeve 8 is preferably mounted and sealed in both the valve casing 2 and the drive chamber 5 by means of respective first and second slide bearing rings 9, 10 and first and second lip seals 11, 12, such that the sleeve 8 is slidable in the axial sliding direction 8'. The size, shape and position of the flow slots 13 determine the control characteristic of the control valve 1A. The sliding displacement of the regulating sleeve 8 in the valve casing 2 regulates the degree of overlap or opening of the flow slots 13 in the flow channel 7 and thereby regulates the opening and closing of the control valve 1A. Further details of this second embodiment also correspond to the first embodiment, but are not repeated here.

In this second example embodiment, it is the drive arrangement that essentially differs from the first embodiment. The control valve 1A is actuated preferably by an electronically commutated direct current motor 15 that drives a stroke rod 31 by means of a planetary gear 15 with a spindle drive 30. Namely, the stroke rod 31 includes an internal threading that is engaged with the external threading of the rotatably driven spindle 30. The stroke rod 31 is prevented from rotating but allowed to slide in the stroke direction parallel to the rotation axis 16', so that the stroke rod 31 moves linearly in the stroke direction responsively to the rotation of the spindle 30. A simpler spindle follower such as a threaded nut may be used instead of the stroke rod 31. The planetary gear 15 is flanged and is mounted by its flange on the valve casing 2.

The stroke rod 31 is sealed from the drive chamber 5 by means of two opposing bellows boots, an upper and a lower bellows boot 32, 33, respectively. The bellows boots 32, 33 prevent external leakage of the propellant. Furthermore, with regard to the stroke rod 31, the opposing arrangement of the upper and lower bellows boots 32, 33 allows for compensation of the effect of bellows forces upon pressurization. Namely, for any motion of the stroke rod 31, one of the bellows boots is extending or expanding as the other one of the bellows boots is contracting, leading to a balance of the bellows forces and of the internal volume enclosed within the bellows.

A guide sleeve 34 is slidably guided in the drive chamber 5, preferably with an upper and a lower sliding guide ring 35, 36, respectively. The guide sleeve is connected to the stroke rod 31 by a threaded or screwed connection. As can be seen in FIG. 2, a two-arm angle lever 38 is pivotably connected by a pivot joint 37 to the guide sleeve 34. A first lever arm 38A of the lever 38 is pivotably connected to the valve casing 2 by a first bracket or pivotal link 39 with first and second pivot joints 40, 41, respectively. A second lever arm 38B of the lever 38 is pivotably connected to the regulating sleeve 8 by a second bracket or connecting rod 42 with third and fourth pivot joints 43, 44, respectively.

As the stroke rod 31 is moved selectively up or down by the spindle drive 30, the two-arm lever 38 that is pivotably connected to the guide sleeve 34 is caused to move correspondingly up and down and to pivot about the pivot joint 37 due to the pivoting restraint applied by the pivotal link 39. As a result, the lever 38 pivotally drives the connecting rod 42, which in turn linearly slides the regulating sleeve 8. Depending on the position of the regulating sleeve 8, which is responsive to the position of the stroke rod 31, a cross-section of the flow slots 13 will be opened or closed to flow of liquefied fuel from the flow channel 7 to the outlet port 4. In the position shown in FIG. 2, the regulating sleeve 8 is fully closed to prevent the flow of fuel from the flow channel 7.

The interior of the drive chamber 5 is preferably in fluid communication with the flow of fluid, to allow a pressure equalization therebetween. For example, the drive chamber 5 is open into the outlet port 4 where the connecting rod 42 extends from the lever 38 to the regulating sleeve 8. Alternatively, a pressure equalization passage can be provided elsewhere, wherever it insures proper pressure equalization between the interior of the drive chamber 5 and the flow channel 7. Such pressure equalization further ensures that hydraulic forces will not have a disadvantageous influence on the moving parts.

Preferably according to the invention, the only moving part that is directly impinged on by the flow of fluid through the valve is the regulating sleeve 8, which slides perpendicularly relative to the local flow direction of the fuel through the flow slots thereof. Thus, when the valve is closed, the fluid pressure acting on the regulating sleeve has no influence on the driving force necessary for opening the valve, because the fluid pressure acts purely radially on the axially sliding sleeve. This is especially true because the sleeve 8 is slidingly supported internally coaxially within the seal lips 11, 12 and the slide bearing rings 9, 10, so that the radially inwardly directed fluid forces do not strongly press the sleeve against the bearing surfaces (as would be the case if the slidable component were to be arranged coaxially outside of the slide bearing members). On the other hand, when the valve is open, the radial orientation of the flow-induced forces as well as the achieved pressure compensation between the interior of the drive chamber 5 and the flow channel 7 ensure that there will be no influence on the force needed to close the valve.

Also, since the motor and gearing are arranged externally relative to the valve housing, the valve arrangement itself can be made more compact, and the flow channel is not interrupted by the large drive motor and the like arranged directly within the valve housing. This, in combination with the fact that the regulating sleeve is the only moving part of the valve exposed to the flowing fluid, allows the required drive forces and the flow resistance to be further reduced. The present arrangements in which the various drive components are oriented and are movable perpendicularly to the fluid flow also ensures that the flow forces will not have an influence on the required drive forces.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A motor-driven liquid flow control valve comprising:
   a valve housing having an inlet port, an outlet port and a flow channel therein communicating from said inlet port to said outlet port to selectively allow a liquid to flow from said inlet port through said flow channel to said outlet port;
   at least one slide bearing ring arranged in said valve housing coaxially with said outlet port;
   a slidable flow control sleeve arranged radially inside said at least one slide bearing ring in said valve housing coaxially with said outlet port along a first axis, wherein said flow control sleeve is interposed in said flow channel and is slidable along said first axis, and wherein said flow control sleeve comprises a sleeve wall having at least one flow control opening therein, which is selectively positionable in said flow channel to allow flow communication therethrough or positionable out of said flow channel and blocked by said at least one slide bearing ring to prevent flow communication therethrough by selectively sliding said control sleeve along said first axis;
   a drive chamber centrally arranged in said valve housing coaxially on said first axis;
   a drive motor including an output shaft; and
   a drive transmission that is arranged in said drive chamber, connected to said output shaft, and connected to said slidable flow control sleeve symmetrically about said first axis.

2. The control valve according to claim 1, wherein said inlet port, said outlet port and said drive chamber are coaxially aligned with each other along said first axis, wherein said flow channel extends substantially annularly and substantially coaxially around said drive chamber to define a flow path from said inlet port to said outlet port, and wherein said flow path diverges from said inlet port outwardly away from said first axis and around said drive chamber, converges radially inwardly toward said flow control sleeve to selectively pass radially inwardly through said at least one flow control opening, and extends along said first axis through said outlet port.

3. The control valve according to claim 1, wherein said drive chamber is rigidly fixed within and with respect to said valve housing, and wherein said flow control sleeve, said drive transmission and said output shaft are the only movable parts within said valve housing.

4. The control valve according to claim 1, wherein said flow control sleeve is the only movable part of said control valve interposed in said flow channel and impinged on by a flow of liquid flowing through said control valve from said inlet port to said outlet port.

5. The control valve according to claim 1, wherein said drive motor is arranged externally relative to said valve housing and is connected to an exterior of said valve housing, and wherein said output shaft passes from outside of said valve housing into said drive chamber through a hole provided in said valve housing.

6. The control valve according to claim 1, wherein said drive motor is a rotary motor and said output shaft is a rotatable output shaft that is rotatable about a second axis.

7. The control valve according to claim 6, wherein said drive transmission comprises an eccentric drive pin connected to an end of said output shaft at an eccentric offset relative to said second axis, and a connecting rod that is pivotably connected to said flow control sleeve at a pivot point located on said first axis and rotatably connected to said eccentric drive pin.

8. The control valve according to claim 6, wherein said output shaft comprises a threaded drive spindle, and wherein said drive transmission comprises a spindle follower having an internal threading that is engaged on said threaded drive spindle, and a rocking lever linkage that is pivotably connected respectively to said spindle follower and to said flow control sleeve.

9. The control valve according to claim 8, wherein said rocking lever linkage includes a connecting rod, and a two-armed rocking lever that is pivotably connected to said spindle follower and that includes a first lever arm pivotably connected to said valve housing and a second lever arm pivotably connected to said connecting rod, and wherein said connecting rod is further pivotably connected to said flow control sleeve.

10. The control valve according to claim 8, further comprising first and second bellows seal boots arranged coaxially about said second axis respectively on opposite sides of a location at which said rocking lever linkage is connected to said spindle follower.

11. The control valve according to claim 6, wherein said second axis is perpendicular to said first axis, wherein a net flow direction of a liquid flowing from said inlet port to said outlet port through said flow channel is parallel to said first axis, and wherein a local flow direction of the liquid flowing through said at least one flow control opening of said flow control sleeve is radial relative to said first axis.

12. The control valve according to claim 1, wherein an interior space within said drive chamber is in communication with a portion of said flow channel between said at least one flow control opening and said outlet port to provide pressure equalization therebetween at all times regardless of a respective sliding position of said flow control sleeve.

13. A motor-driven control valve for controlling a flow of cryogenically liquefied rocket propellant, said control valve comprising:
- a valve casing having a coaxially aligned inlet port and outlet port,
- a drive chamber arranged in said valve casing,
- a flow channel communicating from said inlet port to said outlet port within said valve casing without traversing through said drive chamber,
- a slidable regulating sleeve that is centrally arranged, slidably supported and sealed in said valve casing and in said drive chamber, that has at least one flow control opening therein and that is interposed in said flow channel and adapted to adjust the size of a controllable flow cross-section through said flow channel via said at least one flow control opening responsively to a sliding of said regulating sleeve,
- an electric motor, and
- a drive mechanism that is arranged at least partly in an interior of said drive chamber and is connected to said motor and to said regulating sleeve, and that is adapted to slide said regulating sleeve responsive to an output rotation of said electric motor,
- wherein said interior of said drive chamber is in communication with said flow channel in such a manner to achieve a pressure equalization between said interior of said drive chamber and a portion of said flow channel between said regulating sleeve and said outlet port at all times regardless of the sliding position of said regulating sleeve, and
- wherein said drive mechanism is not impinged on by a flow of the propellant flowing through said flow channel.

14. The control valve according to claim 13, wherein said regulating sleeve is slidably displaceable in said valve casing in an axial direction along an axis of said inlet port and said outlet port, and said drive mechanism is connected to said regulating sleeve symmetrically about said axis.

15. The control valve according to claim 13, wherein said at least one flow control opening comprises a plurality of flow slots arranged around a circumference of said regulating sleeve, and wherein a control characteristic of said control valve is determined by a size, shape, or position of said flow slots.

16. The control valve according to claim 13, wherein said flow channel comprises an annular flow channel portion that communicates annularly around said regulating sleeve, wherein said annular flow channel portion is adapted to guide the rocket propellant along a flow path that intersects said regulating sleeve radially relative to said axial direction.

17. The control valve according to claim 13, wherein said drive mechanism includes a gear connected to said electric motor, and a drive shaft connected to said gear, and wherein said electric motor and said gear are arranged externally of said valve casing.

18. The control valve according to claim 17, wherein said drive mechanism further comprises a sleeve drive linkage including an eccentric shaft pin, a connecting rod, and a pivot bolt, wherein said eccentric shaft pin, said connecting rod, and said pivot bolt are arranged in said drive chamber, wherein an upper end of said drive shaft is connected to said gear and a lower end of said drive shaft is connected to said eccentric shaft pin, wherein a first end of said connecting rod is rotatably connected to said eccentric shaft pin and a second end of said connecting rod is pivotably connected to said pivot bolt at a location on a common axis of said inlet port and said outlet port, and wherein said pivot bolt is connected to said regulating sleeve symmetrically about said common axis.

19. The control valve according to claim 17, wherein said electric motor is an electronically commutated direct-current motor and said gear is a planetary gear.

20. The control valve according to claim 13, further comprising at least one slide bearing ring, a first ring seal and a second ring seal, wherein said regulating sleeve is slidingly supported radially inside said at least one slide bearing ring, and wherein said first and second ring seals are respectively arranged around said regulating sleeve to seal said regulating sleeve relative to said at least one slide bearing ring.

21. The control valve according to claim 20, wherein an outer diameter of said regulating sleeve is slightly relieved in an area around said at least one flow control opening so as to ensure free movement of said regulating sleeve relative to said ring seals without damaging said ring seals.

22. The control valve according to claim 13, wherein said drive mechanism is arranged substantially perpendicular to a common axis of said inlet port and said outlet port in said valve casing, wherein said drive mechanism includes an electric motor, a gear, a drive spindle connected to said gear, a stroke rod, and a guide sleeve, and wherein said motor and said gear are arranged externally of said valve casing.

23. The control valve according to claim 22, further comprising a sleeve drive linkage including a two-arm lever, a first bracket, and a second bracket, wherein said two-arm lever is pivotably connected to said guide sleeve and pivotably connected at a first arm thereof to said valve casing by said first bracket and pivotably connected at a second arm thereof to said regulating sleeve by said second bracket.

24. The control valve according to claim 22, further comprising an upper bellows boot and a lower bellows boot, wherein said stroke rod is sealed in said upper bellows boot and said lower bellows boot, and wherein said upper and lower bellows boots are arranged to expand and contract respectively opposite one another.

* * * * *